(12) United States Patent
Lee et al.

(10) Patent No.: US 8,831,614 B2
(45) Date of Patent: Sep. 9, 2014

(54) LOAD DISTRIBUTION IN CS FALLBACK

(75) Inventors: Ki-Ho Lee, Gyeonggi-do (KR); Yong-Gyoo Lee, Seoul (KR); Yung-Ha Ji, Gyeonggi-do (KR)

(73) Assignee: KT Corporation, Gyeonggi-do (KR)

( * ) Notice: Subject to any disclaimer, the term of this patent is extended or adjusted under 35 U.S.C. 154(b) by 48 days.

(21) Appl. No.: 13/569,321

(22) Filed: Aug. 8, 2012

(65) Prior Publication Data
US 2013/0065589 A1 Mar. 14, 2013

(30) Foreign Application Priority Data
Aug. 8, 2011 (KR) .................. 10-2011-0078816

(51) Int. Cl.
*H04W 36/00* (2009.01)
(52) U.S. Cl.
CPC ................. *H04W 36/0022* (2013.01)
USPC .................. 455/436; 455/438; 455/443
(58) Field of Classification Search
CPC ............ H04W 36/00; H04W 36/0022
USPC .................................. 455/436, 438, 443
See application file for complete search history.

(56) References Cited

U.S. PATENT DOCUMENTS

| | | | |
|---|---|---|---|
| 6,452,922 | B1 | 9/2002 | Ho |
| 7,796,514 | B2 | 9/2010 | Noriega |
| 8,125,960 | B2 | 2/2012 | Iwamura et al. |
| 8,515,486 | B2 | 8/2013 | Miyata |
| 2006/0178153 | A1 | 8/2006 | Tenny et al. |
| 2008/0318574 | A1 | 12/2008 | Bi |
| 2009/0149180 | A1 | 6/2009 | Kitazoe |
| 2009/0168725 | A1 | 7/2009 | Mishra |
| 2009/0238143 | A1 | 9/2009 | Mukherjee et al. |
| 2010/0008324 | A1 | 1/2010 | Lee et al. |
| 2010/0015978 | A1 | 1/2010 | Yoon et al. |
| 2010/0075679 | A1 | 3/2010 | Tenny et al. |
| 2010/0202413 | A1 | 8/2010 | Vikberg et al. |
| 2010/0222071 | A1* | 9/2010 | Tafreshi et al. ............... 455/453 |

(Continued)

FOREIGN PATENT DOCUMENTS

| | | |
|---|---|---|
| JP | 2011-091587 A | 5/2011 |
| JP | 2011-147069 A | 7/2011 |

(Continued)

OTHER PUBLICATIONS

3GPP TS 23.272 version 9.4.0, "3rd Generation Partnership Project; Technical Specification Group Services and System Aspects; Circuit Switched(CS) fallback in Evolved Packet Sustem(EPS); Stage 2 (Release 9)", ETSI, Jun. 2010, pp. 1-73, Section 4.3.2-4.3.4, France.

(Continued)

*Primary Examiner* — Barry Taylor
(74) *Attorney, Agent, or Firm* — IP Legal Services, LLC

(57) ABSTRACT

Described embodiments provide a method of a circuit switched (CS) fallback procedure at a first network providing only a packet switched (PS) service. A CS fallback procedure may be initiated upon a receipt of a call associated with a CS service. One of carriers assigned to a second network that provides a circuit switched (CS) service may be selected. Then, a second network cell mapped to a serving cell of the first network and using the selected carrier may be selected as a target cell. The user equipment may be handed over o to the selected second network cell in order to provide a requested CS service.

17 Claims, 7 Drawing Sheets

(56) References Cited

U.S. PATENT DOCUMENTS

| | | | |
|---|---|---|---|
| 2010/0278142 A1 | 11/2010 | Dwyer et al. | |
| 2010/0316000 A1 | 12/2010 | Burbidge et al. | |
| 2011/0013560 A1 | 1/2011 | Zhang et al. | |
| 2011/0064052 A1 | 3/2011 | Lee | |
| 2011/0092214 A1 | 4/2011 | Iwamura | |
| 2011/0171962 A1 | 7/2011 | Iwamura et al. | |
| 2012/0015646 A1* | 1/2012 | Burbidge et al. | 455/422.1 |
| 2012/0163249 A1* | 6/2012 | Chin et al. | 370/280 |
| 2012/0165065 A1 | 6/2012 | Sawada et al. | |
| 2012/0170503 A1* | 7/2012 | Kelley et al. | 370/312 |

FOREIGN PATENT DOCUMENTS

| | | |
|---|---|---|
| KR | 10-2005-0068400 A | 7/2005 |
| KR | 10-2005-0121136 A | 12/2005 |
| KR | 10-2007-0110348 A | 11/2007 |
| KR | 10-2008-0026855 A | 3/2008 |
| KR | 10-2008-0080801 A | 9/2008 |
| KR | 10-0920894 B1 | 10/2009 |
| KR | 10-2010-0003664 A | 1/2010 |
| KR | 10-2010-0004833 A | 1/2010 |
| KR | 10-2010-0021156 A | 2/2010 |
| KR | 10-2010-0021478 A | 2/2010 |
| KR | 10-2010-0029869 A | 3/2010 |
| KR | 10-2010-0060353 A | 6/2010 |
| KR | 10-2010-0092742 A | 8/2010 |
| KR | 10-2010-0117752 A | 11/2010 |
| KR | 10-2010-0126776 A | 12/2010 |
| KR | 10-2010-0126818 A | 12/2010 |
| KR | 10-2010-0130211 A | 12/2010 |
| KR | 10-2010-0133821 A | 12/2010 |
| KR | 10-2011-0030051 A | 3/2011 |
| KR | 10-2011-0099327 A | 9/2011 |
| WO | 2010/127435 A1 | 11/2010 |
| WO | 2011/024655 A1 | 3/2011 |

OTHER PUBLICATIONS

3GPP, "Digital cellular telecommunications system (Phase 2+); Universal Mobile Telecommunications System (UMTS); LTE; Circuit Switched (CS) fallback in Evolved Packet System (EPS); Stage 2 (3GPP TS 23.272 version 9.6.0 Release 9)", Jan. 2011, pp. 1-75, ETSI, France.

* cited by examiner

LOAD DISTRIBUTION IN CS FALLBACK

CROSS REFERENCE TO PRIOR APPLICATIONS

The present application claims priority under 35 U.S.C. §119 to Korean Patent Application No. 10-2011-0078816 (filed on Aug. 8, 2011), which is hereby incorporated by reference in its entirety.

The subject meter of this application is related to U.S. patent application Ser. No. 13/563,918 filed Aug. 1, 2012, the teachings of which are incorporated herein in their entirety by reference.

FIELD OF THE INVENTION

The present invention relates to communications and, in particular, to load distribution in circuit switched (CS) fallback.

BACKGROUND OF THE INVENTION

Long term evolution (LTE) may be a standard for wireless data communication technology that delivers a high data rate, low latency and packet optimized radio access technology. LTE, however, supports only a packet switched (PS) service while a universal mobile telecommunications system radio access network (UTRAN) supports both of a circuit switched (CS) service and a packet switched (PS) service. In order to provide a CS service in a LTE network, circuit switched fallback may be employed in the LTE network.

The CS fallback may enable the provisioning of voice and other CS services by reuse of a GSM/EDGE radio access network (GERAN) or a UTRAN CS infrastructure when user equipment is served by a LTE network. GSM may by an abbreviation of a global system for mobile communications and EDGE may be abbreviation of enhanced data rates for GSM evolution. The CS fallback is only available if LTE service coverage is overlapped with service coverage of a GERAN or a UTRAN CS network. For example, in the LTE network, a CS fallback procedure may hand over user equipment from a serving LTE cell to an associated non-LTE cell in order to process a mobile originated (MO) call or a mobile terminated (MT) call while the user equipment is camping on the serving LTE cell. The non-LTE cell may be a GERAN cell or a UTRAN cell. The LTE cell may be mapped to a corresponding non-LTE cell in a one-to-one relation. A CS fallback call may be transferred from the serving LTE cell to the corresponding non-LTE cell in the CS fallback procedure.

In case of a UTRAN including a wideband code division multiple access (WCDMA) network, multiple frequency assignments (FAs) may be used by one UTRAN cell. Frequency assignment (FA) may denote a frequency channel unit that can be allocated to each a cell base station. That is, each cell base station may be allocated with a plurality of carriers to provide a corresponding service to user equipment. Accordingly, multiple logical UTRAN cells may be vertically overlaid on a LTE cell although one physical UTRAN cell is overlaid on a LTE cell. During a CS fallback procedure, one UTRAN cell may be selected as a target cell for handover of user equipment. Since one UTRAN cell may use multiple carriers, a carrier to provide a CS fallback service may be properly selected from the allocated multiple carriers based on radio environments of thereof.

SUMMARY OF THE INVENTION

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, a target cell for CS fallback may be selected based on load states of carriers assigned to an associated UTRAN cell.

In accordance with another aspect of the present invention, one having comparatively less load may be selected as a target carrier from multiple carriers assigned to an associated UTRAN cell in order to provide a CS fallback service.

In accordance with still another aspect of the present invention, one of multiple carriers assigned to an associated UTRAN cell may be selected in a round robin method as a target carrier for providing a CS fallback service.

In accordance with still another aspect of the present invention, a UTRAN cell with a comparatively less load may be selected as a target cell for CS fallback.

In accordance with still another aspect of the present invention, one of multiple carriers assigned to an associated UTRAN cell may be selected in a round robin method and a CS fallback service may be provided through the selected carrier of the associated UTRAN cell.

In accordance with an embodiment of the present invention, a method may be provided for a circuit switched (CS) fallback procedure at a first network providing only a packet switched (PS) service. The method may include initiating a CS fallback procedure upon a receipt of a call associated with a CS service, selecting one of carriers assigned to a second network that provides a circuit switched (CS) service, determining, as a target cell, a second network cell mapped to a serving cell of the first network and using the selected carrier, and performing handover of the user equipment to the selected second network cell to provide a requested CS service.

The selecting one of the carriers may be in sequence order. Furthermore, the selecting one of the carriers may include using an equation of: X mod N, where X denotes a total number of a CS fallback procedure performed and N denotes a total number of carriers allocated to the second network.

The selecting one of the carriers may be based on information on load states of the carriers. In this case, the selecting one of carriers assigned to a second network may include determining whether the information on load states of the carriers is available. If the information on load states of the carriers is available, one having a lowest load may be selected from the carriers based on the information on load states of the carriers. Otherwise, one may be selected in a predetermined sequence from the carriers.

In accordance with another embodiment of the present invention, a method may be provided for selecting a target cell in a UMTS radio access network (UTRAN) for circuit switched (CS) fallback at a long term evolution (LTE) cell in a LTE network. The method may include providing a packet switched (PS) service to user equipment camped on the LTE cell, initiating a CS fallback procedure when detecting an attempt for a CS service of user equipment, determining a base station of a UTRAN cell mapped to the LTE cell, selecting one of carriers assigned to the determined base station of the UTRAN cell mapped to the LTE cell, selecting a UTRAN cell using the selected carrier as a target UTRAN cell, and performing handover of the user equipment to the selected UTRAN cell.

The attempt for a CS service may be detected when receiving at least one of i) a request for a CS service from the user equipment and ii) a call associated to a CS service from other party in associated network.

The determining the base station of the UTRAN cell may be based on a mapping table stored in the serving LTE cell. The mapping table may contain information on mapping relations between LTE cells and UTRAN cells overlapping with the LTE cells.

The selecting one of the carriers may be in a sequence order using a round robin algorithm. Furthermore, the selecting one of the carriers may include using an equation of: X mod N, where X denotes a total number of a CS fallback procedure performed and N denotes a total number of carriers allocated to the second network.

The selecting one of the carriers assigned to the determined base station may be based on information on load states of the carriers. In this case, the selecting one of carriers assigned to the determined base station may include determining whether the information on load states of the carriers is available. If the information on load states of the carriers is available, one having a comparatively low load may selected, as compared to the other carriers based on the information on load states of the carriers. Otherwise, one from the carriers may be selected in a sequence order regardless of the load states of the carriers.

The determined base station may be assigned with multiple carriers. Multiple UTRAN cells may be formed each using a different one of the multiple carriers assigned to the determined base station. In this case, a UTRAN cell using the selected carrier may be selected as the target UTRAN cell from the multiple UTRAN cells formed by the determined base station.

After the performing handover of the user equipment, the user equipment receives a requested CS service through the selected UTRAN cell using the selected barrier.

In accordance with still another embodiment of the present invention, a base station of a first network may be provided for providing only a packet switched (PS) service to user equipment camping on the base station. The base station may include a transceiver, a CS fallback processor, and a carrier selector. The transceiver may be configured to receive a request for a circuit switched (CS) service from the user equipment camping on the base station and a call associated with the CS service from a node in an associated network. The CS fallback processor may be configured to i) initiate a CS fallback procedure upon the receipt of the request for the CS service and the call associated with the CS service, and ii) determine a base station of a second network providing the CS service, which is mapped to the base station of the first network. The carrier selector may be configured to select one of multiple carriers assigned to the determined base station of the second network. The CS fallback processor may be configured to select one cell using the selected carrier as a target cell from multiple second network cells formed by the determined base station using the assigned carriers and may be configured to perform handover of the user equipment to the selected second network cell.

The carrier selector may be configured to select one of the assigned carriers in sequence order using a round robin algorithm. The carrier selector may be configured to select one of the assigned carriers using an equation of: X mod N, where X denotes a total number of a CS fallback procedure performed and N denotes a total number of carriers allocated to the second network. The carrier selector may be configured to select one of the assigned carriers based on information on load states of the multiple carriers.

The carrier selector may be configured to determine whether the information on load states of the multiple carriers is available. The carrier selector may select one having a comparatively low load as compared to the other carriers based on the information on load states of the multiple carriers when the information on load states of the carriers is available. Otherwise, the carrier selector may select one from the assigned carriers in a sequence order regardless of the load states of the assigned carriers.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Figure 1:
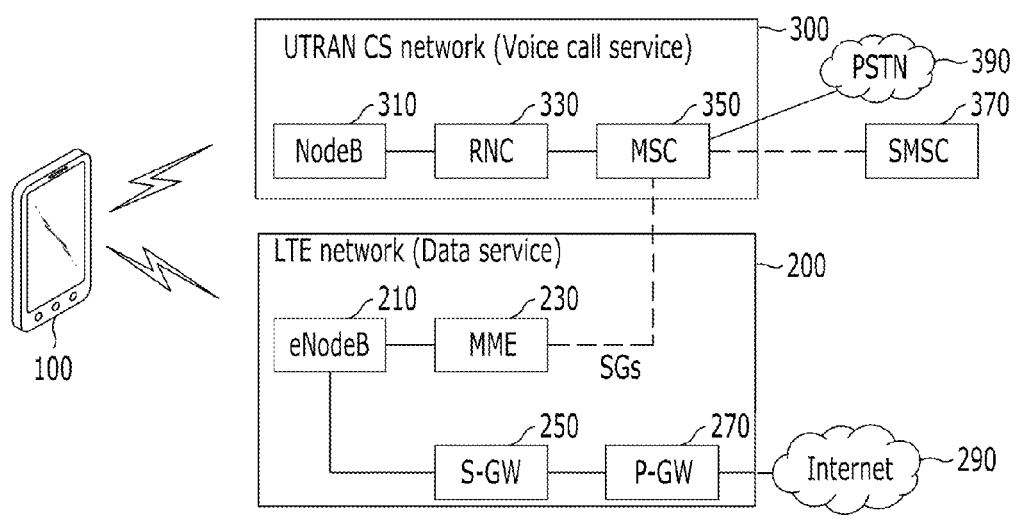
FIG. 1 shows a mobile communication environment where circuit switched (CS) fallback is available in accordance with embodiments of the present invention.

Reference will now be made in detail to embodiments of the present invention, examples of which are illustrated in the accompanying drawings, wherein like reference numerals refer to like elements throughout. The embodiments are described below, in order to explain the present invention by referring to the figures.

As described, CS fallback may be available only where a LTE network co-exists with a non-LTE network such as a GERAN and/or a UTRAN. Such a mobile communication environment will be described with reference to FIG. 1. For convenience and ease of understanding, a UTRAN CS network will be described as a non-LTE network throughout the specification, but the present invention is not limited thereto. The non-LTE network may be a GERAN in accordance with another embodiment of the present invention.

FIG. 1 shows a mobile communication environment where CS fallback is available in accordance with embodiments of the present invention.

As shown in FIG. 1, the CS fallback may be available where LTE network 200 overlaps with UTRAN CS network 300. The CS fallback may enable user equipment 100 camping on a LTE cell to use a CS service by using resources of UTRAN CS network 300. The CS service may include a voice service, a video service, a short message service (SMS), a location service (LCS), an unstructured supplementary service data (USSD), and likes.

User equipment 100 may be a user device for receiving various types of services, such as a CS service and a PS service. Particularly, user equipment 100 may support a CS fallback function and be capable of accessing LTE network 200 as well as accessing UTRAN CS network 300 in accordance with embodiments of the present invention. Accordingly, user equipment 100 may hand over a CS fallback call from a serving LTE cell to a corresponding UTRAN cell in the mobile communication environment shown in FIG. 1.

Referring to FIG. 1, LTE network 200 may include evolved NodeB (eNodeB) 210, mobility management entity (MME) 230, serving gateway (S-GW) 250, and packet data network gateway (P-GW) 270. LTE network 200 may be connected to Internet 290. LTE network 200 may provide only a PS service to user equipment 100 camping on corresponding eNodeB 210, which is a LTE cell base station.

eNodeB 210 may be a base station of a LTE cell in LTE network 200. eNodeB 210 may support a function for transmitting a paging request to user equipment 100 for CS fallback and a function for transferring a SMS message to user equipment 100 in accordance with embodiments of the present invention. Furthermore, eNodeB 210 may support a function of directly accessing a related UTRAN cell base station, such as a NodeB, for CS fallback.

MME 230 may be a control node for LTE network 200. In accordance with embodiments of the present invention, MME 230 may support the CS fallback. In order to support the CS fallback, MME 230 may have a function of selecting multiple public land mobile networks (PLMN) (not shown) for a CS domain and a function of selecting a radio access technology for a CS domain. Furthermore, MME 230 may derive a visiting location registration (VLR) number and a location area identity (LAI) from a tracking area identify (TAI) of the current cell and based on the selected PLMN or the selected RAT for CS domain, or using a default VLR number and LAI. MME 230 may deliver the registered PLMN ID for CS domain included in the LAI to eNodeB 210. MME 230 may deliver a registered PLMN ID for a CS domain to eNodeB 210. MME 230 may initiate a paging procedure towards eNodeB 210 when user equipment 100 is paged for CS services. MME 230 may support combined evolved packet system/international mobile subscriber identity (EPS/IMSI) attach procedure, a combined tracking area/location area (TA/LA) update procedure, and a detach procedure. Furthermore, MME 230 may process a SMS message. MME 230 may establish and manage a SGs interface to mobile switching center (MSC) 350 of UTRAN CS network 300.

S-GW 250 may route and forward user data packets. Furthermore, S-GW 260 may function as the mobility anchor when user equipment 100 is handed over between a LTE cell to a non-LTE cell.

P-GW 270 may provide connectivity from user equipment 100 to an external packet data network such as Internet 290. P-GW 270 may function as exit and/or entry of traffic for user equipment 100. Furthermore, P-GW 270 may allocate an Internet protocol (IP) address of user equipment 100 and perform operations associated with packet data of a core network. P-GW 270 may be a mobility anchor when user equipment moves between 3$^{rd}$ generation partnership project (3GPP) radio network and non-3GPP radio network such as worldwide interoperability for microwave access (WiMAX). P-GW 270 may be referred to as a PDN gateway.

UTRAN CS network 300 may support a CS service as well as a PS service. User equipment 100 may be handed over from LTE network 200 to UTRAN CS network 300 for CS fallback when user equipment 100 is camping on a LTE cell in LTE network 200 and attempts to use a CS service such as a voice call in accordance with embodiments of the present invention. UTRAN CS network 300 may include NodeB 310, radio network controller (RNC) 330, mobile switching center (MSC) 350, and short message service center (SMSC) 370. UTRAN CS network 300 may be connected to public switched telephone network (PSTN) 390.

NodeB 310 and RNC 330 may be a radio access network in UTRAN CS network 300. NodeB 310 and RNC 330 may employ asynchronous transfer mode (ATM). NodeB 310 and RNC 330 may be located between user equipment 100 and a wireless communication core network and transfer data and control information. NodeB 310 may be a base station of a UTRAN cell in UTRAN CS network 300. NodeB 310 may support the CS fallback. RNC 330 may control and manage NodeB 310 that is connected thereto. RNC 330 may carry out radio resource management and mobility management. RNC 330 may encrypt user data before the user data is sent to user equipment 100.

MSC 350 may support the CS fallback in accordance with embodiments of the present invention. In order to support the CS fallback, MSC 350 may perform operations associated with a combined EPS/IMSI attach procedure, a combined TA/LA update procedure, a detach procedure, and a SMS message in cooperation with MME 230 of LTE network 200. MSC 350 may maintain a SGs interface to MME 230. For the CS fallback function, the combined EPS/IMSI attach procedure, the combined TA/LS update procedure, and the detach procedure may be performed in advance for mobility management. These procedures may be referred to as a location registration procedure.

The CS fallback between LTE network 200 and UTRAN CS network 300 may be realized through three schemes, as shown in Table 1.

TABLE 1

| CS fallback scheme | Description |
| --- | --- |
| Basic Redirection | Simply handover user equipment from a LTE network to a UTRAN CS network. It might generate a voice call connection delay. Establish a SGs interface between MSC and MME for interaction between a LTE network and a UTRAN CS network. Originated CS call setup time: about 3.8 second (1.5 second additionally required) |
| Redirection with SI | Provide UTRAN target cell information from a UTRAN CS network to a LTE network in advance. eNodeB is required to set WCDMA SI of a target cell (automatically or manually). Originated CS call setup time: about 2.6 second (0.3 second additionally required) |
| PS handover | Transmit and receive a voice call after handover from LTE network to UTRAN Cause additional signaling load for processing call handover. Originated CS call setup time: about 2.8 second (0.5 second additionally required). |

Referring to Table 1, the basic redirection scheme may i) release connection to LTE network 200 for a CS fallback call and ii) establish connection to UTRAN CS network 300. The CS fallback redirection with SI scheme may provide system information (SI) of UTRAN CS network 300, manually or automatically, to LTE network 200 in advance. Accordingly, a call setup delay may be shortened in the CS fallback redirection with SI scheme. The PS handover scheme may handover user equipment 100 from LTE network 200 to UTRAN CS network 300 for processing a CS fallback call.

Among the three schemes, the redirection with SI scheme and the PS handover scheme may provide, in advance, system information of a target cell such as a UTRAN cell (WCDMA cell) to a LTE cell base station. Hereinafter, a CS fallback procedure performed upon the arrival of a voice call in accordance with embodiments of the present invention will be described with reference to FIG. 2A and FIG. 2B.

Figure 2A:
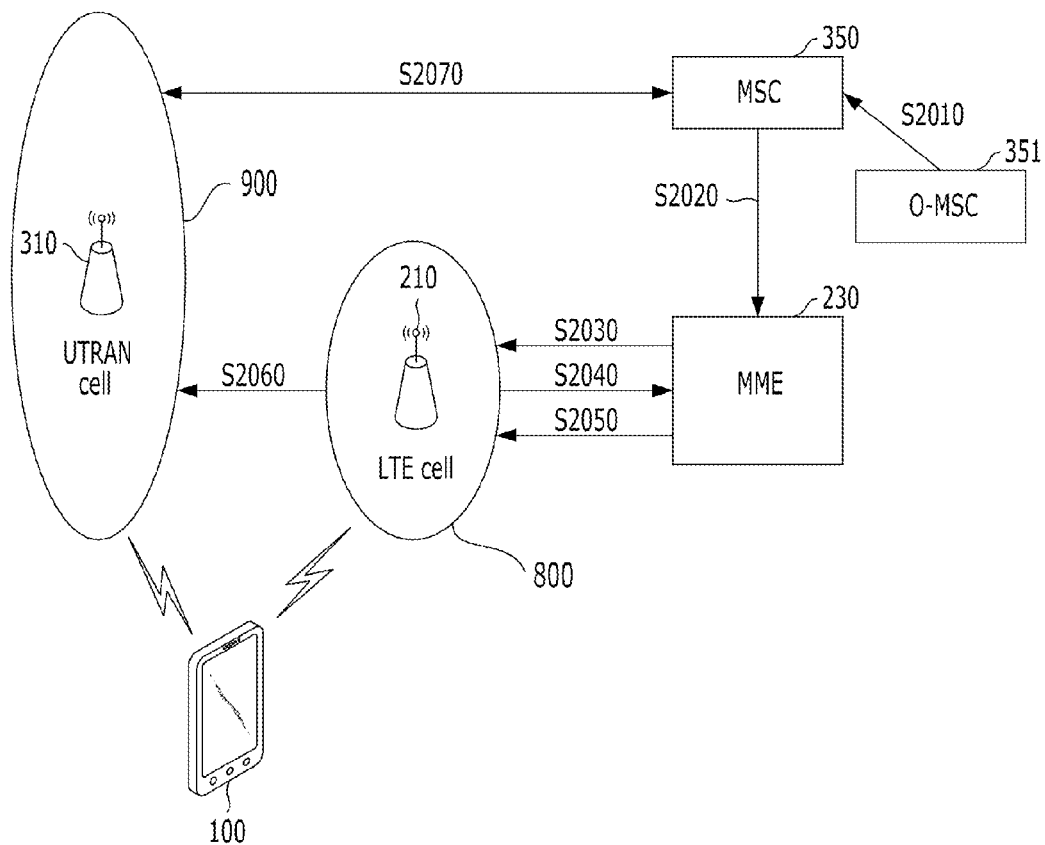
FIGS. 2A and 2B show a CS fallback procedure performed upon the arrival of a voice call in accordance with embodiments of the present invention.
Figure 2B:
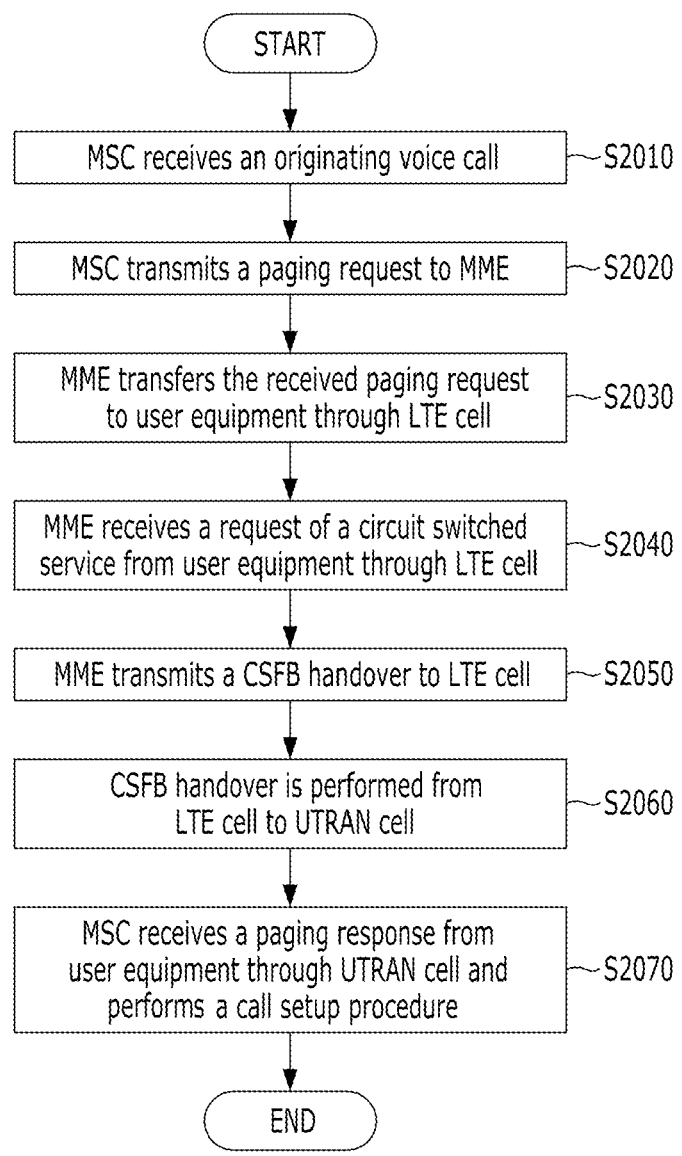

FIGS. 2A and 2B show a CS fallback procedure performed upon the arrival of a voice call in accordance with embodiments of the present invention.

Referring to FIG. 2A and FIG. 2B, MSC 350 of UTRAN CS network 300 may receive a voice call originated from originating MSC (O-MSC) 351 at step S2010. For example, O-MSC 351 may deliver the originated voice call to MSC 350. Before the receipt of the voice call, MSC 350 of UTRAN CS network 300 may provide system information (SI) of UTRAN CS network 300 to user equipment 100 camping on LTE cell 800 which is managed by eNodeB 210 of LTE network 200.

At step S2020, MSC 350 of UTRAN CS network 300 may transmit a paging request to MME 230 of LTE network 200 using a generic security service application protocol (GSsAP). At step S2030, MME 230 of LTE network 200 may deliver the received paging request to user equipment 100 through LTE cell 800.

At step S2040, MME 230 of LTE network 200 may receive a CS service request from user equipment 100 through LTE cell 800 in response to the paging request. At step S2050, MME 230 of LTE network 200 may transmit a handover command to LTE cell 800.

At step S2060, user equipment 100 may perform a handover procedure from LTE cell 800 to UTRAN cell 900. UTRAN cell 900 may be a UTRAN cell mapped to serving LTE cell 800 of user equipment 100. As a result, user equipment 100 may be complete handover from LTE cell 800 to UTRAN cell 900. At step S2070, MSC 350 of UTRAN CS network 300 may receive a paging response from user equipment 100 through UTRAN cell 900. Furthermore, MSC 350 of UTRAN CS network 300 may perform a call setup procedure. After the call setup procedure, a voice call service may be provided to user equipment 100 through UTRAN cell 900 in accordance with embodiments of the present invention.

As described above, LTE cell 800 may be mapped to UTRAN cell 900 for the CS fallback. Such mapping relation between LTE cells and UTRAN cells will be described with reference to FIG. 3.

Figure 3:
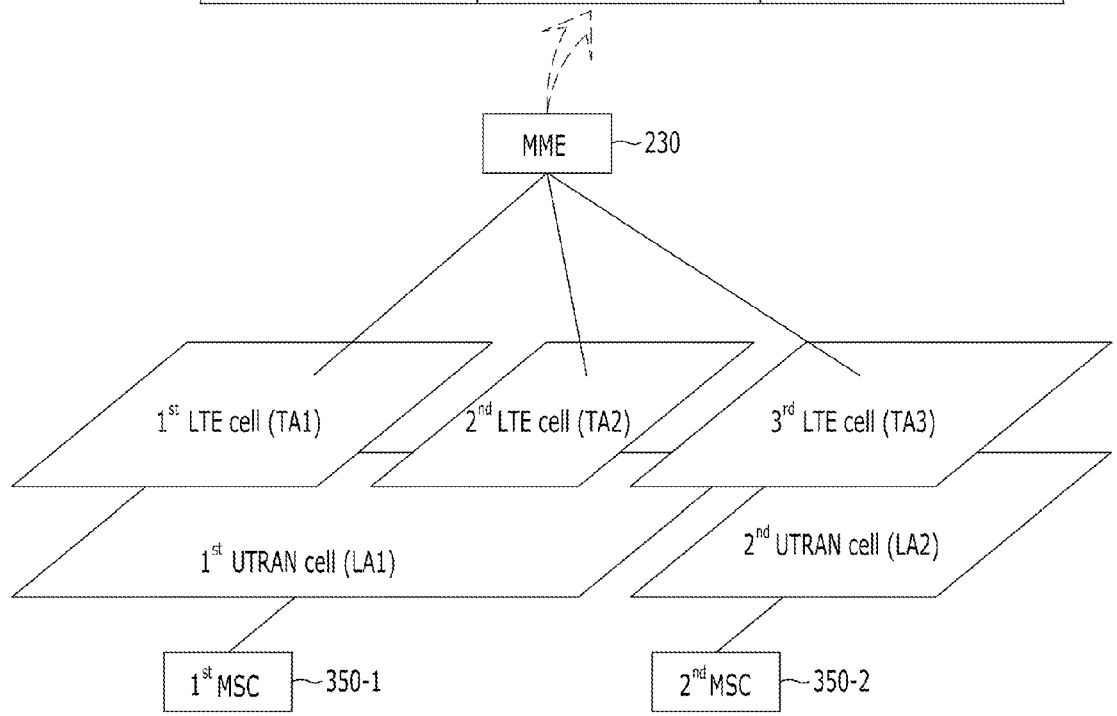
FIG. 3 shows a mapping relation between LTE cells and UTRAN cells in accordance with embodiments of the present invention.

FIG. 3 shows a mapping relation between LTE cells and UTRAN cells in accordance with embodiments of the present invention.

Referring to FIG. 3, MME 230 of LTE network 200 may manage first tracking area TA1, second tracking area TA2, and third tracking area TA3. First mobile switching center 350-1 of UTRAN CS network 300 may manage first location area LA1 and second mobile switching center 350-2 of UTRAN CS network 300 may manage second location area LA2.

Such mapping relations between the tracking areas (TA1, TA2, and TA3) and the location areas (LA1 and LA2) may be stored in mapping table 3010. MME 230 of LTE network 200 may store and manage mapping table 3010. As shown in mapping table 3010, first tracking area TA1 and second tracking area TA2 may be mapped to first location area LA1 managed by first mobile switching center 350-1. Furthermore, third tracking area TA3 may be mapped to second location area LA2 managed by second mobile switching center 350-2.

MME 230 may manage the CS callback service based on mapping table 3010. For example, MME 230 may process a CS callback call of user equipment 100 located at one of first tracking area TA1 and second tracking area TA2 through first mobile switching center 350-1. MME 230 may process a CS callback call of user equipment 100 located at third tracking area TA3 through second mobile switching center 350-2.

Accordingly, MME 230 of LTE network 200 may provide information of first location area LA1 to user equipment 100 that enters into first tracking area TA1 and second tracking area TA2 before the CS fallback procedure is initiated. Furthermore, MME 230 of LTE network 200 may provide information of second location area LA2 to user equipment 100 that enters into third tracking area TA3.

As described, a serving LTE cell may select a UTRAN cell mapped thereto as a target UTRAN cell for CS fallback using mapping table 3010. A base station of the target UTRAN cell, for example NodeB 210, may be allocated with multiple frequency assignments (FAs). That is, the base station of the target UTRAN cell may use multiple carriers for providing a related service. Accordingly, multiple target UTRAN cells each using a different carrier may be mapped to a serving LTE cell. Hereinafter, multiple UTRAN cells each assigned with different carrier will be described with reference to FIG. 4.

Figure 4:
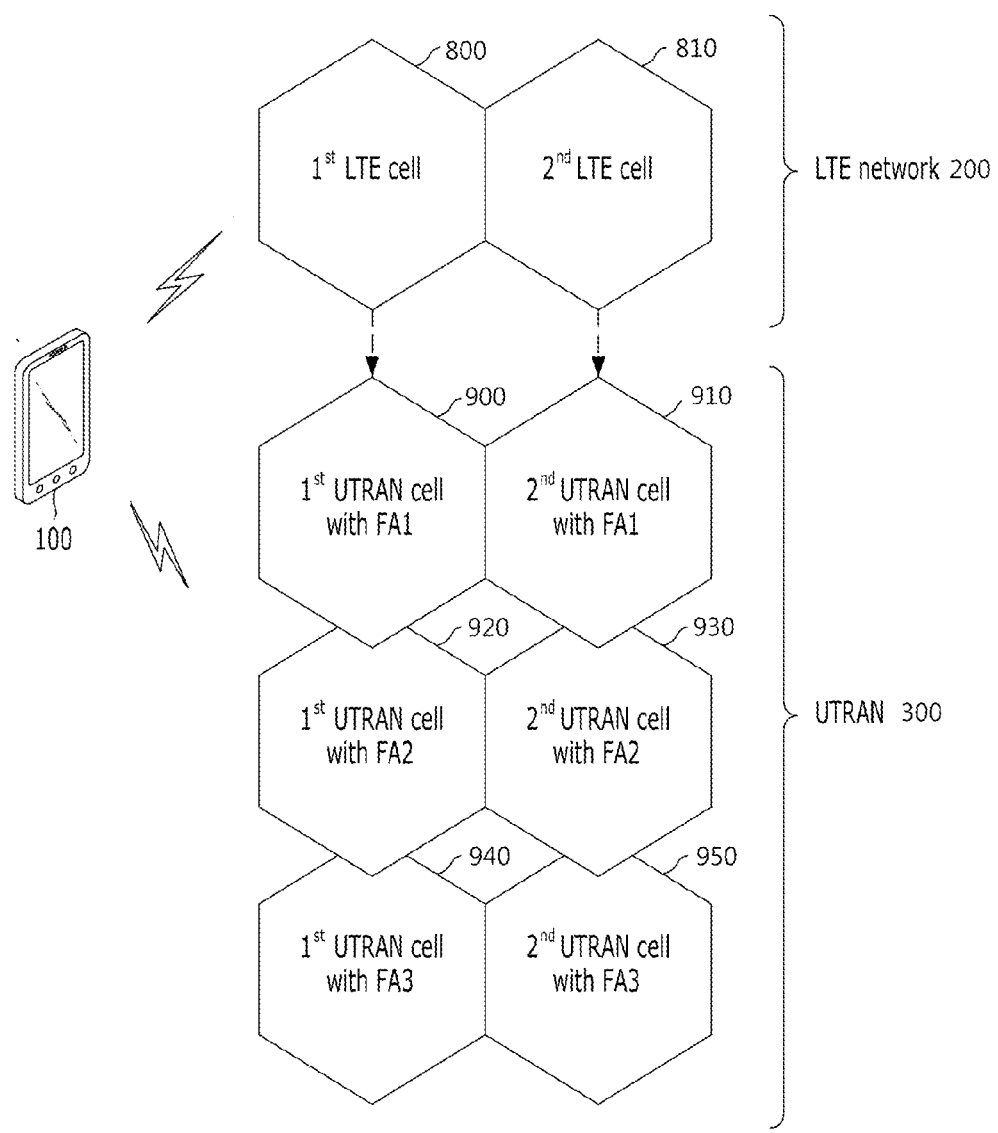
FIG. 4 shows UTRAN cells each allocated with multiple carriers in accordance with embodiments of the present invention.

FIG. 4 shows UTRAN cells each allocated with multiple carriers in accordance with embodiments of the present invention.

Referring to FIG. 4, LTE network 200 may include first LTE cell 800 and second LTE cell 810. First LTE cell 800 may be governed by first eNodeB 210 and second LTE cell 810 may be governed by a second eNodeB (not shown). As described, LTE cells may be mapped to UTRAN cells for CS fallback and multiple carriers may be allocated to a NodeB. In case of three carriers allocated, first LTE cell 800 may be mapped to three UTRAN cells, for example, first UTRAN cell 900 assigned with first carrier, second UTRAN cell 920 assigned with second carrier, and third UTRAN cell 930 assigned with third carrier. Such first, second, and third UTRAN cells 900, 920, and 940 may be governed by NodeB 310. Furthermore, second LTE cell 810 may be mapped to three UTRAN cells, for example, fourth UTRAN cell 910 assigned with first carrier, fifth UTRAN cell 930 assigned with second carrier, and sixth UTRAN cell 950 assigned with third carrier. Fourth UTRAN cell 910, fifth UTRAN cell 930, and sixth UTRAN cell 950 may be governed by a second NodeB (not shown).

When a CS fallback procedure is performed for user equipment 100 camping on first LTE cell 800, eNodeB 210 of first LTE cell 800 may select one of UTRAN cells 900, 920, and 940 mapped to first LTE cell 810 for handover of user equipment 100. Typically, eNodeB 210 may randomly select one of three UTRAN cells 900, 920, and 940 without consideration of a radio environment of each carrier because of difficulty in provisioning of system information blocks (SIBs) of associated UTRAN cells for all carriers. Accordingly, excessive load may be concentrated at one of the three carriers allocated with a target UTRAN cell, for example one of three UTRAN cells 900, 920, and 940.

In order to distribute such load over multiple carriers allocated with a target UTRAN cell, load states of the carriers may be considered for selecting a target UTRAN cell for a CS fallback service in accordance with embodiments of the present invention. Such operation will be described with reference to FIG. 5.

Figure 5:
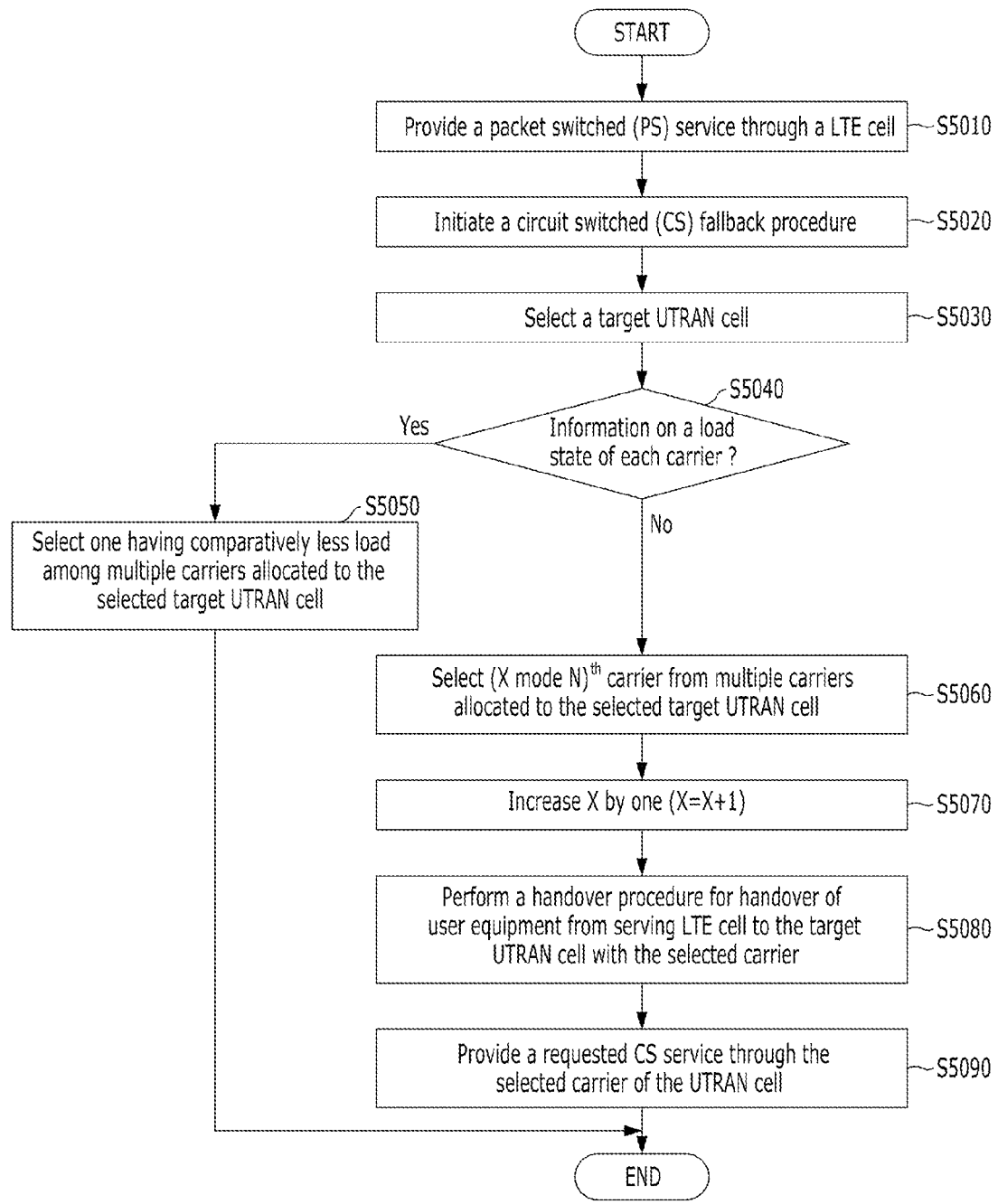
FIG. 5 shows a method for selecting a target UTRAN cell for CS fallback based on load states of carriers allocated with the target UTRAN cell in accordance with embodiments of the present invention.

FIG. 5 shows a method for selecting a target UTRAN cell for CS fallback based on load states of carriers allocated with the target UTRAN cell in accordance with embodiments of the present invention.

Referring to FIG. 5, a PS service may be provided through a LTE cell to user equipment camping on the LTE cell at step S5010. For example, LTE cell 800 may provide a PS service to user equipment 100. As described, LTE cell 800 may provide only the PS service. Accordingly, when user equipment 100 is camping on LTE cell 800 and needs a CS service, user equipment 100 may initiate a CS fallback procedure.

At step S5020, a CS fallback procedure may be initiated. For example, the CS fallback procedure may be initiated when user equipment 100 makes an attempt for the CS service such as a voice call or a short message service (SMS) call. Particularly, when LTE cell 800 receives a request for a CS service from user equipment 100 or a call associated to a CS service from the other party, the CS fallback procedure may be initiated. The CS fallback procedure may select a UTRAN cell mapped to the serving LTE cell and hand over user equipment from the serving LTE cell to the selected UTRAN cell in order to process a CS service. Since multiple carriers are allocated in UTRAN 300, a plurality of UTRAN cells may be overlaid on a LTE cell as shown in FIG. 4. That is, a plurality of UTRAN cells each using different carrier may be mapped to the same LTE cell. For example, LTE cell 800 may be mapped to first, second, and third UTRAN cells 900, 920, and 940 each using different carrier. Accordingly, one of UTRAN cells 900, 920, and 940 may be selected as a target cell for the CS fallback procedure. In order to efficiently select the target cell, load balancing among carriers may be considered in accordance with embodiments of the present invention.

At step S5030, a UTRAN cell mapped to the serving LTE cell may be determined. For example, eNodeB 210 may determine a NodeB of a UTRAN cell mapped to LTE cell 800 based on mapping table 3010.

Since multiple carriers are allocated to a NodeB of a corresponding UTRAN cell mapped to serving LTE 800, one of carriers to provide a CS service may be selected based on a load state of each carrier in accordance with embodiments of the present invention. Accordingly, load may be balanced in multiple carriers assigned to corresponding UTRAN cell At step S5040, determination may be made as to whether information on load states of associated carriers is available. For example, eNodeB 210 of first LTE cell 800 may determine whether information on load states of carriers allocated to the determined UTRAN cell mapped to serving first LTE cell 800. In order to determine, eNodeB 210 may request, to NodeB 310, the information on load states of first, second, and third carriers allocated thereto. If such information is available in NodeB 310, NodeB 310 may provide the information on load states of first, second, and third carriers to eNodeB 210. However, the present invention is not limited thereto. Such information may be obtained or provided through radio information management (RIM) in interaction with UTRAN 300.

At step S5050, a carrier having comparatively less load may be selected based on the information on the load states of carriers when the carrier load information is available (Yes—S5040). For example, eNodeB 210 of first LTE cell 800 may select one having comparatively low load from the first, second, and third carrier based on the information on the load states of the carriers, which may be received from NodeB 310. eNodeB 210 may compare the carriers in the load states and select one having the lowest load from the first, second and third carriers. In this manner, since a carrier having the lowest load may be selected among the associated carriers, the loads of the carriers may be balanced. The steps S5030 and S5040 may be not essential processing steps in accordance with embodiments of the present invention. Furthermore, the steps S5030 and S5040 may create another processing load in eNodeB 210. The present invention, however, is not limited thereto. That is, the steps S030 and S5040 may be omitted in accordance with another embodiment of the present invention.

At step S5060, one of the carriers associated with the determined UTRAN cell may be selected in a Round Robin method when the carrier load information is not available (No—S5040). For example, eNodeB 210 of serving LTE cell 800 may sequentially select one from the carriers assigned to eNodeB 210 based on a Round Robin method. Particularly, Eq. 1 may be used for selecting a carrier from the three carriers allocated to NodeB 310.

$$\text{Carrier}_i = X \bmod N \qquad \text{Eq. 1}$$

In Eq. 1, "" may denote the identification number of a carrier. For example, first carrier may have an identification number of 1. N denotes the total number of carriers allocated to NodeB 310. X may denote a total number of processing a CS fallback procedure performed. Based on the Eq. 1, one of the carriers allocated to the determined UTRAN cell may be selected. In this manner, the carriers may be sequentially selected so the load may be distributed evenly.

At step S5070, the total number of the CS fallback procedure performed may increase by one. For example, eNodeB 210 may increase X by one. Accordingly, the next carrier of the selected carrier may be selected from another CS fallback procedure.

At step S5080, a handover procedure may be performed based on the determined UTRAN cell with the selected carrier. For example, eNodeB 210 may select a UTRAN cell using the selected carrier. When the first carrier is selected, eNodeB 210 may select first UTRAN cell 900 as the target cell for CS fallback. Accordingly, eNodeB 210 may hand over user equipment 100 to first UTRAN cell 900 assigned with the first carrier.

At step S5090, a requested CS service may be provided through the selected carrier of the UTRAN cell. For example, first UTRAN cell may provide the requested CS service through the first carrier.

As described, eNodeB 210 may determine a UTRAN cell mapped to a serving LTE cell and select one of carriers allocated to the determined UTRAN cell based on load states of the carriers. Then, eNodeB 210 may hand over user equipment 100 to the UTRAN cell allocated with the selected carrier in accordance with embodiments of the present invention. Hereinafter, such eNodeB 210 will be described with reference to FIG. 5.

Figure 6:
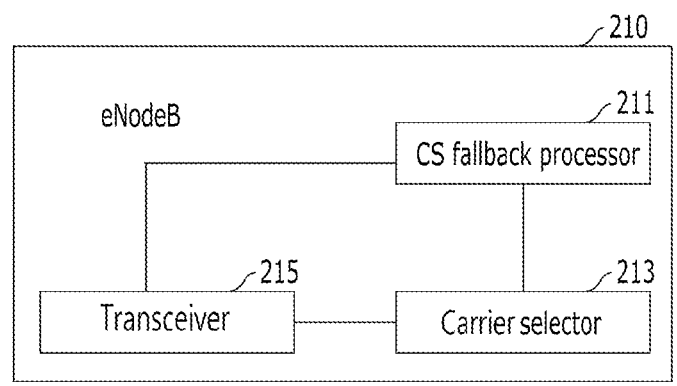
FIG. 6 shows an eNodeB for selecting a target UTRAN cell for CS fallback based on load states of carriers in accordance with embodiments of the present invention.

FIG. 6 shows an eNodeB for selecting a target UTRAN cell for CS fallback based on load states of carriers in accordance with embodiments of the present invention.

Referring to FIG. 6, eNodeB 210 may include CS fallback processor 211, carrier selector 213, and transmitter 215.

CS fallback processor 211 may perform operations associated with a CS fallback procedure. For example, CS fallback processor 211 may detect an attempt for a CS service such as a voice call or a SMS call. Such attempt may be detected when eNodeB 210 receives a request for a CS service from user equipment 100 or receives a call associated with a CS service from the other party. Upon the detection of the CS service attempt, CS fallback processor 211 may initiate a CS fallback procedure. After the initiation of the CS fallback procedure, CS fallback processor may determine a UTRAN cell mapped thereto, for example, NodeB 310. Since the UTRAN cell mapped to eNodeB 210 is allocated with multiple carriers, one of the carriers may be selected in accordance with embodiments of the present invention. Accordingly, CS fallback processor 211 may inform carrier selector 213 of the determination of the UTRAN cell in order to invoke carrier selector 213 to select one of the carriers.

Furthermore, CS fallback processor 211 may receive a selection of carrier from carrier selector 213 and select a UTRAN cell using the selected carrier as a target UTRAN cell for the CS fallback service. Based on the selected UTRAN cell, CS fallback processor 211 may perform operations related to handover of user equipment 100 to the UTRAN cell using the selected carrier in accordance with embodiments of the present invention.

In addition, CS fallback processor 211 may determine a type of a CS fallback procedure to perform, for example, a redirection with SI scheme or a PS handover scheme based on system information of UTRAN 300. Such system information of UTRAN 300 may be received in advance. When the type of the CS fallback procedure is one of the redirection with SI scheme and the PS handover scheme, CS fallback processor 211 may inform carrier selector 213 of the attempt of the CS service in order to select one of carriers.

Carrier selector 213 may be informed of the attempt of the CS service when CS fallback processor 211 detects the attempt. Carrier selector 213 may determine whether information on load states of carriers allocated to the determined UTRAN cell is available or not. For example, carrier selector 213 may request such information to a NodeB of the determined UTRAN cell and receive the information from the NodeB if it is available. However, the present invention is not limited thereto. Such information may be obtained from or provided from other entity in an associated network.

When the information on load states of the multiple carriers is obtained or provided from the NodeB of the determined UTRAN cell, carrier selector 213 may select one having comparatively low load from the multiple carriers allocated to the determined UTRAN cell based on the information on load states of the multiple carriers. Carrier selector 213 may compare the carriers based on the load states and select one having the lowest load from the multiple carriers. Carrier selector 213 may return the result of selection to CS fallback processor 211. The present invention, however, is not limited thereto. The operations for requesting the information and comparing the load states may be not essential parts of embodiments of the present invention and also create a processing load. Accordingly, such operations may be not omitted in accordance with another embodiment of the present invention.

Carrier selector 213 may select one of the carriers using a Round Robin method when the information on load states of the multiple carriers is not available. Alternatively, carrier selector 213 may simply select one of the carriers using a Round Robin method regardless of the information on load states of the multiple carriers in accordance with embodiments of the present invention. Carrier selector 213 may use Eq. 1 for selecting a carrier from the three carriers allocated to NodeB 310. Since Eq. 1 was already described, the detail description thereof is omitted herein. After selecting one of the carriers, carrier selector 213 may return the selection of the carrier to CS fallback processor 211 and increase the total number of performing the CS fallback procedure in order to select the next carrier for the next CS fallback procedure. For example, carrier selector 213 may increase "X" by one in Eq. 1. As described above, the multiple carriers may be selected fairly for the CS fallback procedure in accordance with embodiments of the present invention. Accordingly, loads are about equally distributed over the carries allocated to an associated UTRAN cell in accordance with embodiments of the present invention.

Transceiver 215 may receive and transmit messages related to the CS fallback procedure. For example, transceiver 215 may receive a request for a CS service from user equipment 100 or a call invoking a CS fallback procedure from other entity in an associated network. Transceiver 215 may exchange messages related to a handover procedure with other entity such as MSC 350 in the associated network or with user equipment. Transceiver 215 may transmit a request of the information on load states of carriers to a NodeB of a UTRAN cell mapped to eNodeB 210. In response to the request, transceiver 215 may receive the requested information from the NodeB. Furthermore, transceiver 215 may transmit information on the target UTRAN cell using the selected carrier to user equipment 100. For example, transceiver 215 may receive a system information block (SIB) of the target UTRAN cell using the selected carrier through MSC 350 and transmit the received SIB to user equipment 100 before CS fallback.

As described above, hand over of user equipment 100 may be from a LTE cell to a UTRAN cell for a CS service in accordance with embodiments of the present invention Such user equipment 100 will be described with reference to FIG. 7.

Figure 7:
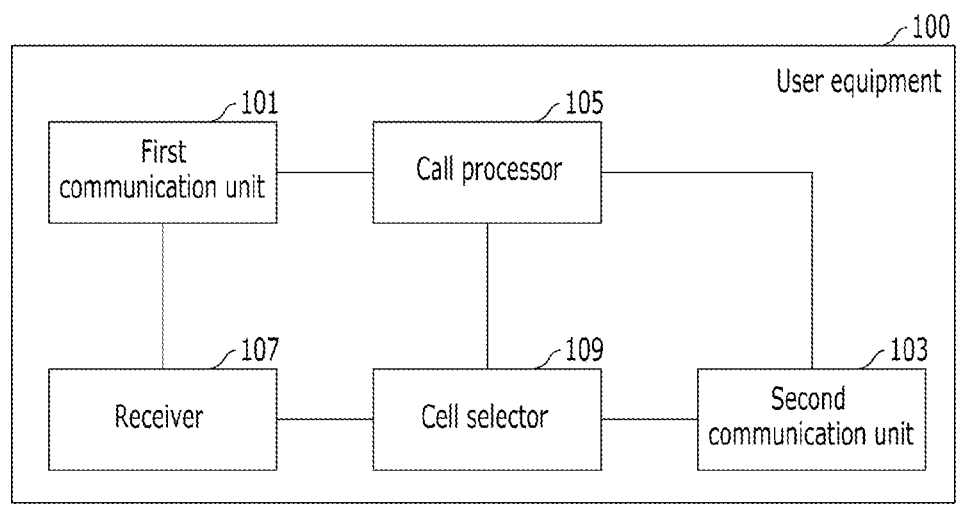
FIG. 7 shows user equipment in accordance with embodiment of the present invention.

FIG. 7 shows user equipment in accordance with embodiment of the present invention.

Referring to FIG. 7, user equipment 100 may include first communication unit 101, second communication unit 103, call processor 105, receiver 107, and cell selector 109.

First communication unit 101 may perform operations related to communication to a first network. The first network may provide only a PS service. For example, the first network may be LTE network 200. In this case, first communication unit 101 may establish a connection to LTE cell 800 of LTE network 200 through exchanging related messages with eNodeB 210 of LTE cell 800.

Second communication unit 103 may perform operations related to communication with a second network. The second network may provide not only a PS service but also a CS service. For example, the second network may be UTRAN 300. In this case, second communication unit 101 may establish a connection to UTRAN cell 900 of UTRAN 300 through exchanging related message with NodeB 310 of UTRAN cell 900.

Call processor 105 may process a PS service call and a CS service call of user equipment 100. Call processor 105 may transmit a call to eNodeB 210 through first communication unit 101 to request a CS service. Such a call may invoke the CS fallback procedure. Accordingly, user equipment 100 may be handed over from eNodeB 210 to a corresponding NodeB as the result of the CS fallback procedure in accordance with embodiments of the present invention.

Receiver 107 may receive signals and messages related to the CS fallback procedure in accordance with embodiments of the present invention. Receiver 107 may receive information on the second network through first communication unit 101 prior to the CS fallback procedure. For example, the information on UTRAN 300 that provides a requested CS service may be received through receiver 107. The information on UTRAN 300 may be a system information block (SIB) of UTRAN 300. Furthermore, the SIB may include information on at least one UTRAN cell supporting the selected carrier. The SIB may include information on UTRAN cells mapped to a serving LTE cell that user equipment 100 is currently camping thereon.

Cell selector 109 may select one of cells to access based on the SIB received through receiver 107. In accordance with embodiments of the present invention, cell selector 109 may select one of cells based on messages from a serving LTE cell. That is, cell selector 109 may select a UTRAN cell using a selected carrier in order to be provided with a CS service. In this case, call processor 105 may process a CS service call received through second communication unit 103 after user equipment 100 is handed over to the UTRAN cell using the selected carrier.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of a circuit switched (CS) fallback procedure at a first network providing only a packet switched (PS) service, the method comprising:
   initiating a CS fallback procedure upon a receipt of a call associated with a CS service;
   selecting one of carriers assigned to a second network that provides a circuit switched (CS) service;
   determining, as a target cell, a second network cell mapped to a serving cell of the first network and using the selected carrier; and
   performing handover of the user equipment to the selected second network cell to provide a requested CS service,
   wherein the selecting one of the carriers includes using an equation of: X mod N, where $Carrier_i = X \bmod N$, where $Carrier_i$ denotes an identification number of a carrier, X denotes a total number of a CS fallback procedure performed and N denotes a total number of carriers allocated to the second network.

2. The method of claim 1, wherein:
   the selecting one of the carriers is in sequence order.

3. The method of claim 1, wherein:
   the selecting one of the carriers is based on information on load states of the carriers.

4. The method of claim 1, wherein the selecting one of carriers assigned to a second network includes:
- determining whether the information on load states of the carriers is available; and
- if the information on load states of the carriers is available, selecting one having a lowest load from the carriers based on the information on load states of the carriers;
- otherwise, selecting one from the carriers in a predetermined sequence.

5. A method of selecting a target cell in a UMTS radio access network (UTRAN) for circuit switched (CS) fallback at a long term evolution (LTE) cell in a LTE network, the method comprising:
- providing a packet switched (PS) service to user equipment camped on the LTE cell;
- initiating a CS fallback procedure when detecting an attempt for a CS service of user equipment;
- determining a base station of a UTRAN cell mapped to the LTE cell;
- selecting one of carriers assigned to the determined base station of the UTRAN cell mapped to the LTE cell;
- selecting a UTRAN cell using the selected carrier as a target UTRAN cell;
- performing handover of the user equipment to the selected UTRAN cell,
- wherein the selecting one of the carriers includes using an equation of: X mod N, where $Carrier_i = X \bmod N$, where $Carrier_i$ denotes an identification number of a carrier, X denotes a total number of a CS fallback procedure performed and N denotes a total number of carriers allocated to the second network.

6. The method of claim 5, wherein the attempt for a CS service is detected when receiving at least one of i) a request for a CS service from the user equipment and ii) a call associated to a CS service from other party in associated network.

7. The method of claim 5, wherein:
- the determining the base station of the UTRAN cell is based on a mapping table stored in the serving LTE cell,
- wherein the mapping table contains information on mapping relations between LTE cells and UTRAN cells overlapping with the LTE cells.

8. The method of claim 5, wherein:
- the selecting one of the carriers is in a sequence order using a round robin algorithm.

9. The method of claim 5, wherein:
- the selecting one of the carriers assigned to the determined base station is based on information on load states of the carriers.

10. The method of claim 9, wherein the selecting one of carriers assigned to the determined base station includes:
- determining whether the information on load states of the carriers is available; and
- if the information on load states of the carriers is available, selecting one having a comparatively low load as compared to the other carriers based on the information on load states of the carriers,
- otherwise, selecting one from the carriers in a sequence order regardless of the load states of the carriers.

11. The method of claim 5, comprising:
- assigning the determined base station with multiple carriers; and
- forming multiple UTRAN cells each using a different one of the multiple carriers assigned to the determined base station.

12. The method of claim 11, comprising selecting a UTRAN cell using the selected carrier as the target UTRAN cell from the multiple UTRAN cells formed by the determined base station.

13. The method of claim 5, wherein, after the performing handover of the user equipment, the user equipment receives a requested CS service through the selected UTRAN cell using the selected barrier.

14. A base station of a first network providing only a packet switched (PS) service to user equipment camping on the base station, the base station comprising:
- a transceiver configured to receive a request for a circuit switched (CS) service from the user equipment camping on the base station and a call associated with the CS service from a node in an associated network;
- a CS fallback processor configured to i) initiate a CS fallback procedure upon the receipt of the request for the CS service and the call associated with the CS service, and ii) determine a base station of a second network providing the CS service, which is mapped to the base station of the first network; and
- a carrier selector configured to select one of multiple carriers assigned to the determined base station of the second network,
- wherein the CS fallback processor is configured to select one cell using the selected carrier as a target cell from multiple second network cells formed by the determined base station using the assigned carriers and is configured to perform handover of the user equipment to the selected second network cell, and
- wherein the carrier selector is configured to:
- select one of the assigned carriers using an equation of: X mod N, where $Carrier_i = X \bmod N$, where $Carrier_i$ denotes an identification number of a carrier, X denotes a total number of a CS fallback procedure performed and N denotes a total number of carriers allocated to the second network.

15. The base station of claim 14, wherein the carrier selector is configured to select one of the assigned carriers in sequence order using a round robin algorithm.

16. The base station of claim 14, wherein the carrier selector is configured to select one of the assigned carriers based on information on load states of the multiple carriers.

17. The base station of claim 14, wherein the carrier selector is configured to:
- determine whether the information on load states of the multiple carriers is available;
- select one having a comparatively low load as compared to the other carriers based on the information on load states of the multiple carriers when the information on load states of the carriers is available;
- otherwise, select one from the assigned carriers in a sequence order regardless of the load states of the assigned carriers.

* * * * *